UNITED STATES PATENT OFFICE.

WILLIAM A. CALLENDER, OF PEORIA, ILLINOIS.

IMPROVEMENT IN MEDICAL COMPOUNDS OR BITTERS.

Specification forming part of Letters Patent No. 149,573, dated April 14, 1874; application filed February 5, 1874.

*To all whom it may concern:*

Be it known that I, WILLIAM A. CALLENDER, of the city of Peoria, State of Illinois, have invented a medicine or mixture for the cure of liver complaint and other malarious diseases; and do hereby declare that the following is a true description of the ingredients, quantities thereof, and mode of preparing or compounding, and administering the same.

Take of senna leaves, one ounce; aloes, half an ounce; rhubarb root, one ounce; Peruvian bark, one ounce; cardamom seeds, half an ounce; cubebs, half an ounce; blessed thistle, two ounces; wormwood, two ounces; licorice root, half an ounce; sarsaparilla root, one ounce; juniper berries, two ounces; agaricus, one ounce. These ingredients are steeped in ten gallons of pure spirits, of 100° gravity, or proof, at a heat of about 140° Fahrenheit, for twelve hours in an air-tight vessel. After this time, draw off the liquid and let it settle until clear. Then add white sugar until the gravity of the spirits is reduced to 84°. Then add one ounce of burnt-sugar coloring, and for every gallon add one-fourth of an ounce of allspice, and it is then fit for use.

The dose for an adult is two table-spoonfuls, three times a day, before meals, for four or five days, after which time a dose once a day will be sufficient until the cure is effected. For adult females, or girls over twelve years of age, one table-spoonful three times a day, before eating. For children under twelve years, one tea-spoonful three times a day, reduced by sweetening to the child's taste.

I call the medicine "Liver-Bitters."

What I claim as my invention is—

The compound medicine, prepared and compounded and to be used substantially as described.

In testimony that I claim the foregoing medical compound I have hereunto set my hand this 27th day of January, 1874.

WILLIAM A. CALLENDER.

Witnesses:
 H. W. WELLS,
 JOHN MARSTON.